United States Patent [19]

Jones et al.

[11] Patent Number: 4,945,227
[45] Date of Patent: Jul. 31, 1990

[54] AVALANCHE PHOTODIODE QUENCHING CIRCUIT

[75] Inventors: Robin Jones, Worcester; Kevin D. Ridley, Southampton, both of England

[73] Assignee: The Secretary of State for Defence in Her Britannic Majesty's Government of the United Kingdom of Great Britain and Northern Ireland, London, England

[21] Appl. No.: 359,754
[22] PCT Filed: Nov. 23, 1987
[86] PCT No.: PCT/GB87/00837
§ 371 Date: May 16, 1989
§ 102(e) Date: May 16, 1989
[87] PCT Pub. No.: WO88/04034
PCT Pub. Date: Jun. 2, 1988

[30] Foreign Application Priority Data

Nov. 25, 1986 [GB] United Kingdom ............. 8628110
Feb. 11, 1987 [GB] United Kingdom ............. 8703105

[51] Int. Cl.$^5$ .................. G01J 1/44; H01L 31/02; H04B 9/00
[52] U.S. Cl. ................. 250/214 R; 307/311
[58] Field of Search ....... 250/214 R, 214 A, 214 AG, 250/214 C, 551; 357/13; 307/311

[56] References Cited

PUBLICATIONS

Applied Optics, vol. 26, No. 12, Jun. 15, 1987 (New York, U.S.), R. G. W. Brown et al.: "Characterization of Silicon . . . Active Quenching", pp. 2383–2389.
IEEE Transactions on Nuclear Science, vol. NS-29, No. 1, Feb. 1982, (New York, U.S.), S. Cova et al., "Active-Quenching . . . Diodes (SPADS)", pp. 599–601.
Applied Optics, vol. 22, No. 13, Jul. 1, 1983, Optical Society of America, (New York, U.S.), T. E. Ingterson et al., "Photon . . . Photodiodes", pp. 2013–2018.

Primary Examiner—David C. Nelms
Assistant Examiner—George Beck
Attorney, Agent, or Firm—Nixon & Vanderhye

[57] ABSTRACT

An avalanche photodiode quenching circuit comprises a low value photodiode series resistor and a comparator amplifier. The comparator compares the photodiode potential with a reference voltage and changes state rapidly after initiation of a photodiode avalanche. The photodiode is actively quenched by taking its potential below breakdown. This achieved by a fast-switching transistor activated by avalanche detection at the comparator. A further fast-switching transistor is arranged to reset the comparator input after a preset delay following avalanche detection. The photodiode recharges passively through the series resistor at a rapid rate since this resistor has a low value. The quench and reset transistors are deactivated by comparator reset, the latter after the preset delay once more, and are isolated from the photodiode during recharge by diodes. The invention avoids the use of active photodiode reset pulses, and has constant output pulse width and well-defined dead-time.

14 Claims, 3 Drawing Sheets

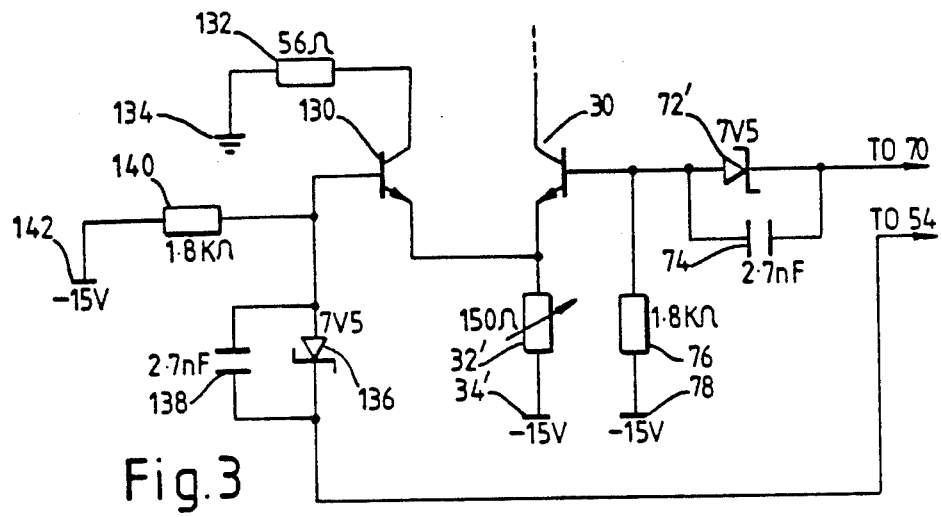
Fig. 3
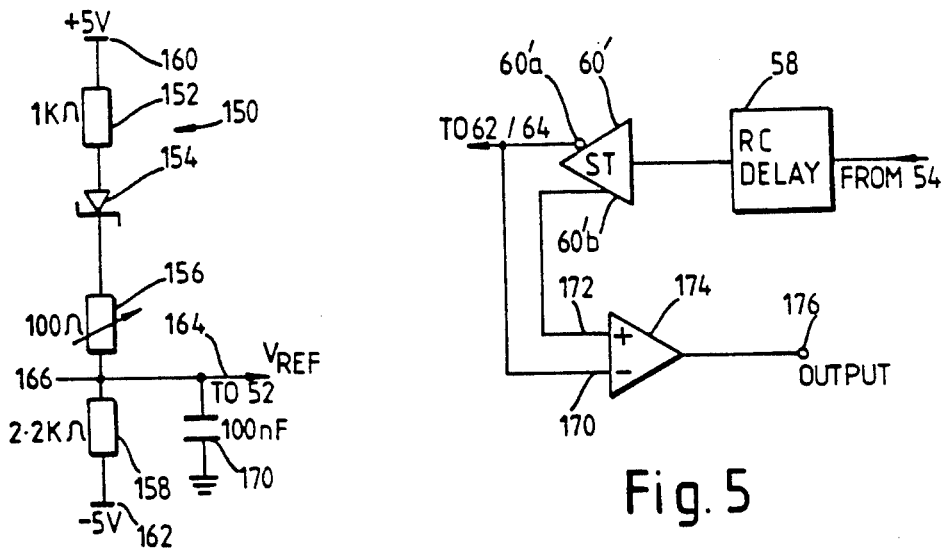
Fig. 4
Fig. 5

AVALANCHE PHOTODIODE QUENCHING CIRCUIT

BACKGROUND OF THE INVENTION

1. Field of the Invention

This invention relates to an avalanche photodiode quenching circuit for use in photon counting measurements.

2. Discussion of Prior Art

Photon counting measurements were originally, and are to some extend presently, carried out using photomultiplier tubes for photon detection. A typical photomultiplier is however relatively fragile, bulky and expensive. The search for a more convenient alternative has led to the use of photodiodes operated in the so-called avalanche Geiger mode. This mode entails reverse-biasing the photodiode with a bias voltage typically a few volts greater than the photo-diode breakdown voltage $V_{BR}$. $V_{BR}$ is the voltage at which a single photon absorption produces complete electrical breakdown of the photodiode active region by cascaded collision ionisation. It is analogous to the ionisation processes occurring in the gas phase in a Geiger-Muller tube.

Avalanche photodiodes are comparatively inexpensive and rugged, and exhibit high quantum efficiencies. They are not however without disadvantages. In particular, for the purpose of achieving high quantum efficiencies, it is necessary to operate at reverse voltages at least bordering on that capable of producing a self-sustaining avalanche in the photodiode. If the photodiode avalanche current reaches a value referred to as $I_{latch}$, typically 50 microamps, the avalanche is self-sustaining in the absence of further photons. This may produce catastropic failure. The photodiode is substantially insensitive to photons while in the avalanche condition. Furthermore, it experiences temperature stress which, after the avalanche is terminated by removing the bias voltage, manifests itself as an increased dark current in subsequent operation. This reduces measurement accuracy and sensitivity, since dark current counts must be subtracted from the total count in a measurement, and both are subject to Poissonian statistics. Furthermore, a sustained current through the photodiode in excess of $I_{latch}$ tends to fill normally empty defect sites or traps in the photodiode semicondcutor material. These traps have long life times compared to the minimum time between counts or dead-time of the photodiode. Trapped charge carriers are therefore released considerably later than, but are correlated with, a photon absorption responsible for the avalanche creating them. The release produces so-called after pulses which are detected by the measuring circuitry monitoring the photodiode. This is a serious problem in the field of photon correlation spectroscopy in particular, since it means that the detection system introduces a degree of correlation between detected pulses which is absent in the original light beam. The measured autocorrelation function will therefore exhibit spurious features which affect or even invalidate the measurement results.

To circumvent these difficulties, the approach in the art has been to provide means for quenching an avalanche as soon as possible after initiation and detection. One particularly simple approach is referred to as passive quenching. It involves arranging the photodiode in series with a comparatively large series resistor, e.g. 220 kohm, and applying the bias voltage across the series arrangement. Prior to photon absorpiton, i.e. when the photodiode is quiescent, the bias appears across the substantially non-conducting photodiode. After absorption, the resistor limits the maximum current taken by the photodiode to a value below $I_{latch}$ when the falling voltage across the photodiode becomes equal to $V_{BR}$. The avalanche is therefore automatically terminated. This arrangement is adequate for comparatively low photodetection rates up to 250 KHz and light intensity fluctuation frequencies up to the same value. However, its disadvantage is that the photodiode is comparatively slow to recover from a detection event. The photodiode must recharge its capacitance through the large resistance before it returns to the quiescent or photosensitive state and this leads to a dead-time in the order of 1 microsecond. Furthermore, during recharge, the photodiode has a variable and increasing sensitivity, so that the dead-time is ill-defined.

Dead-time limitations render the passively quenched avalanche photodiode suitable for photon correlation laser anemometry and spectroscopy experiments where the photon correlator sample time or delay is greater than a few microeconds. However, light intensity fluctuation frequencies greater than 1 MHz regualarly occur in photon correlation measurements on particle diameters of a few tens of nanometres, and also in transonic and supersonic fluid flow measurements by laser Doppler anemometry. A passively quenched avalanche photodiode is not capable of detecting such frequencies.

In IEEE Transactions on Nuclear Science, Vol NS-29, No 1, Feb. 1982 (Reference 1), Cova et al describe active quenching circuits for an avalanche photodiode. In this technique, an avalanche is detected very quickly after initiation. A feedback circuit responds by applying a quenching pulse to the photodiode, taking its reverse bias voltage below breakdown and quenching the avalanche. After quenching, a reset pulse is applied to the photodiode to restore its reverse voltage to the original above-breakdown value. The photodiode is accordingly both actively quenched and actively reset. This produces a very short dead-time in the order of a few tens of nanoseconds. However, in practice this technique possesses disadvantages. The photodiode has a reverse voltage of about 4 V in excess of its breakdown voltage $V_{BR}$, and it is required to detect an avalanche as soon as possible after this voltage has begun to fall. It is necessary for the quenching circuit to respond to a fall of a few tens of millivolts. Moreover, the reset pulse is required to re-establish the original reverse voltage very accurately without re-triggering the feedback circuit and generating a spurious count. In practice this is difficult to achieve. Furthermore, the circuits are characterised by an ill-defined dead-time. Two photon absorption events too close together in time produce a situation in which a counter has not fully recovered from a first pulse before it receives a second, and the second is not detected. This results in discrimination against recordal of second pulses; it is known as the "odd-even" effect, since for example a first or odd-numbered pulse is more likely to be counted than a second or even-numbered pulse. In a typical photon correlator, this will introduce spurious correlation effects distorting the measured correlation function.

SUMMARY OF THE INVENTION

It is an object of the present invention to provide an alternative form of avalanche photodiode quenching circuit.

The present invention provides an avalanche photodiode quenching circuit including:

(1) an avalanche photodiode,
(2) a comparator having an input to detect avalanche initiation by comparing photodiode potential with a reference potential,
(3) a ballast resistor in series with and arranged for recharging the photodiode,
(4) a quenching circuit connected to the photodiode, the quenching circuit being arranged to reduce photodiode potential below breakdown voltage in response to avalanche detection by the comparator and to be deactivated by comparator reset,
(5) a reset circuit arranged to reset the comparator input after a present delay in response to avalanche detection by the comparator and to be deactivated after the preset delay in response to comparator reset, and
(6) isolating means arranged to isolate the photodiode electrically from the quenching circuit during quiescence and recha. e and from the reset circuit and comparator during quench and recharge.

The invention provides a number of advantages over the prior art. Firstly, the photodiode is actively quenched but is reset or restored to quiescence passively by recharge through the ballast resistor. It is the comparator which is reset actively, not the photodiode. As a result, the photodiode is allowed to recharge naturally through the ballast resistor while isolated from the quench and reset circuits. There is consequently no need for photodiode reset pulses and their associated dificulties as in the prior art. Moreover, since the ballast resistor is not responsible for quenching avalanches, it may be arranged to have a value much lower than that used in passive quenching circuits providing a much shorter photodiode recharge time. With a preset delay which is appreciably longer than the response time of the comparator, the total circuit dead-time is largely that due to the repeated delay and the output length due to photon detection is nearly equal to this delay plus comparator response time. The circuit of the invention is therefore capable of providing a well-defined dead-time with constant output pulse width, which is greatly beneficial for dead-time correction and accurage pulse counting.

In a preferred embodiment, the quenching and reset circuits incorporate fast-switching transistors activated by signals from the comparator. The transistors are arranged to connect additional sources of potential to the photodiode and comparator input respectively in response to photon detection, and to disconnect these sources in response to comparator reset. The preset delay may be implemented by means of an RC network and a pulse-shaping Schmitt trigger circuit. Alternatively, a correctly terminated delay line may be employed. The isolating means may comprise fast-switching, low capacitance diodes with biasing means arranged to produce conducting and non-conducting diode states during quiescence/recharge or quench/recharge as appropriate.

BRIEF DESCRIPTION OF THE DRAWINGS

In order that the invention might be more fully understood, an embodiment thereof will now be described, with reference to the accompanying drawings, in which:

FIGS. 3, 4 and 5 illustrate modifications to the circuit of FIG. 1 for the purposes of enhanced insensitivity to ambient temperature variation and matching to a 50 ohm load.

DETAILED DESCRIPTION OF PREFERRED EMBODIMENT

Figure 1:
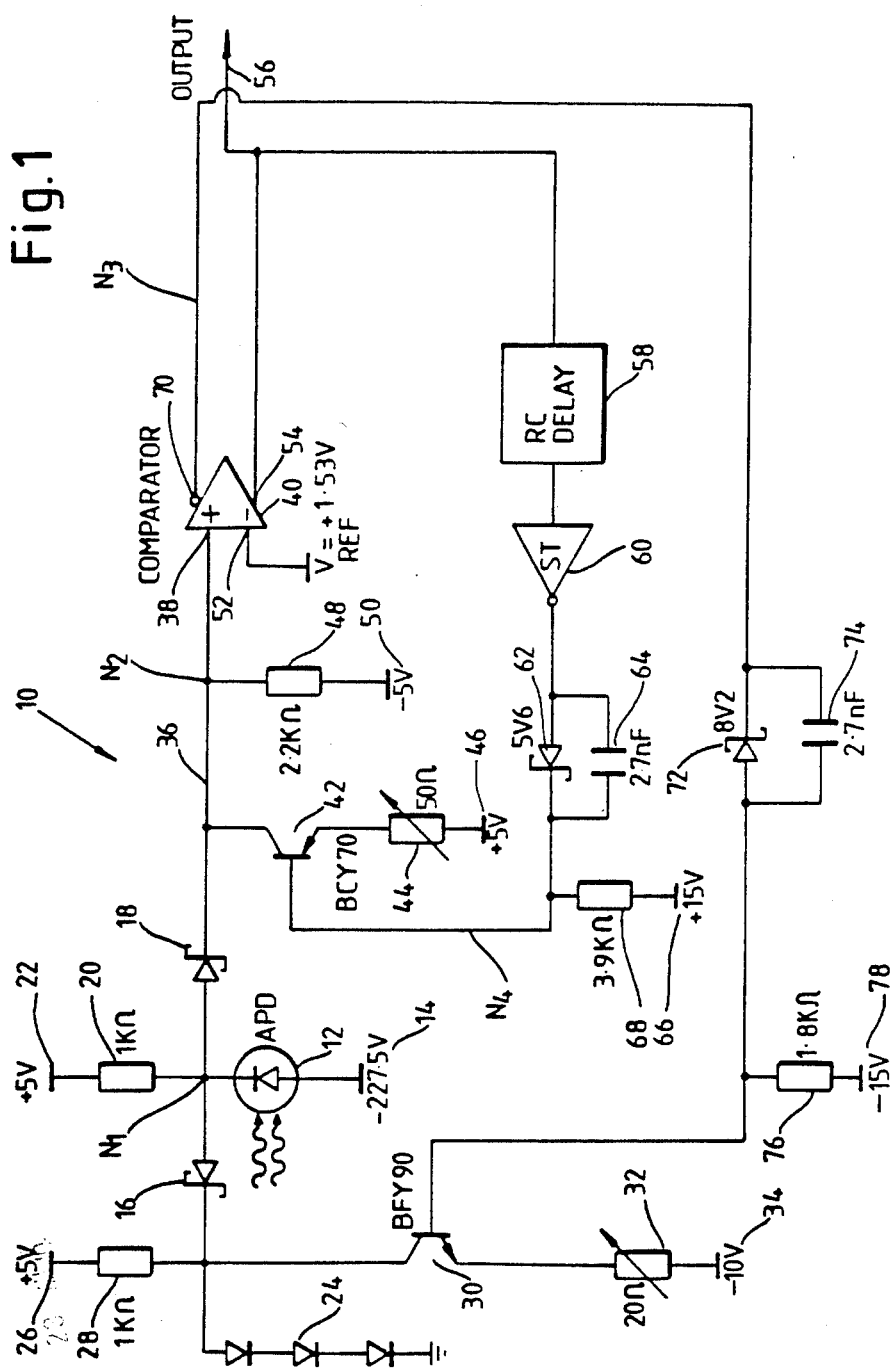
FIG. 1 is a schematic drawing of an avalanche photodiode quenching circuit of the invention, FIG. 2 schematically illustrates voltage level changes in the FIG. 1 circuit in response to photon detection.

Referring to FIG. 1, there is shown an avalanche photodiode quenching circuit of the invention indicated generally by 10. It incorporates an avalanche photodiode (APD) 12 connected between a negative 227.5 V supply 14 and a first circuit node $N_1$. The APD is a type no C30921S manufactured by RCA Inc, an American corporation, and in use is cooled to 0° C. by a Peltier cooler (not shown). The node $N_1$ is connected to two fast-switching, low capacitance Schottky barrier diodes 16 and 18 arranged back to back, and via a 1 kohm resistor 20 to a positive 5 V supply 22. The diode 16 is connected to earth via a chain 24 of three silicon small-signal diodes, to a postive 5 V supply 26 via a 1 kohm resistor 28, and directly to the collector of a fast-switching npn transistor 30 (type BFY 90, industry standard designation). The transistor 30 has a variable emitter resistor 32 of maximum value 20 ohm connected to a negative 10 V supply 34.

The diode 18 is connected via a line 36 to the non-inverting input 38 of a comparator amplifier 40 arranged for open-loop response and characterised by a very high slew rate. The line 36 is also connected to the collector of a fast-switching pnp transistor 42 (type BCY 70), which has a variable emitter resistor 44 of maximum value 50 ohm connected to a positive 5 V supply 46. A 2.2 Kohm resistor 48 is connected between a $-5$ V supply 50 and the line 36.

The comparator 40 has an inverting input 52 connected to a reference voltage $V_{REF}$ of $+1.53$ V. It has a non-inverting output 54 connected to a circuit output 56. The output 56 is also connected to the base of transistor 42 via an RC delay 58, an inverting Schmitt trigger circuit 60 and a 5.6 V zener diode 62 in parallel with a 2.7 nF capacitor 64. The base of the transistor 42 is connected to a positive 15 V supply 66 via a 3.9 kohm biasing resistor 67. The comparator 40 has an inverting output 70 connected to the base of transistor 30 via an 8.2 V zener diode in parallel with a 2.7 nF capacitor 74. The transistor 30 has a 1.8 kohm base bias resistor 76 connected to a negative 15 V supply 78.

For the purposes of the circuit analysis set out herinafter, further circuit nodes $N_2$, $N_3$ and $N_4$ are defined. $N_2$ is the line 36, $N_3$ the inverting comparator output 70 and $N_4$ the base connection to transistor 42.

Referring now also to FIG. 1 there are shown graphs 90, 92, 94, 96 and 98 of voltage against time for circuit nodes $N_1$ to $N_4$ and comparator output 56 respectively. The graphs are not to scale, but indicate operation of the circuit 10 before, during and after a photodetection. They have also been vertically displaced relative to one another to aid clarity. Time instants $t_1$ to $t_6$ are marked on the graphs 90 to 98, $t_1$ representing time of absorption of a photon by the APD 12 and $t_6$ representing time of absorpiton of a photon by the APD 12 and $t_6$ representing time of absorption of a photon by the APD 12 and $t_6$ the time at which the circuit 10 is fully reset. Times $t_2$ to $t_5$ correspond to intervening circuit events to be described.

The circuit 10 operates as follows. Zener diodes 62 and 72 set appropriate base bias voltage levels for transistors 42 and 30, and are short-circuited by capacitors 64 and 74 at high frequenceis to reduce zener idode noise. Prior to $t_1$, the circuit 10 is quiescent. The voltages at $N_1$ and $N_2$ are +2.0 V and +1.56 V respectively, by virtue of current flowing between the +5 V supply 22 and −5 V supply 50 via resistor 20, forward-biased diode 18 (dropping 0.45 V) and resistor 48. The total reverse voltage $V_R$ across the APD 12 is 229.5 V, 5 V in excess of the breakdown voltage $V_{BR}$ of 225.5 V for the praticular APD employed. At this value of $V_R$, the APD 12 employed had a quantum efficiency of 9%. The comparator 40 amplifies the difference between $N_2$ and $V_{REF}$, i.e. 1.56 V−1.53 V. Since this difference is positive, the non-inverting and inverting outputs 54 and 70 (or $N_3$) are positive and negative respectively. Both switching transistors 30 and 42 are accordingly biased to non-conducting states.

Diode chain 24 is forward-biased by virtue of +5 V supply 26 and resitor 28, and the chain 24 drops 2.25 volts, i.e. three times the 0.75 V drop of an individiual diode. Schottky barrier diode 16 accordingly experiences a reverse bias of 0.25 V, the difference between the diode chain voltage and that at node $N_1$ of +2.0 V. Diode 16 is therefore in a non-conducting state.

At time $t_1$, the APD 12 absorbs a photon which initiates a current avalanche, The voltage at $N_1$ begins to fall, which reduces the current flowing to −5 V supply 50 via diode 18 and resistor 48 and so also the voltage at $N_2$ or amplifier input 38. When the voltage at $N_2$ falls by 30 mV at $t_2$, it becomes euqal to $V_{REF}$ and the nett input voltage to comparator 40 becomes zero. When $N_2$ falls below $V_{REF}$, the comparator 40 responds at $t_3$ after a short delay ($t_3$-$t_2$) by changing the polarity of both outputs 54 and 70 ($N_3$). Transistor 30 is consequently switched on, which reduces the cathode potential of Schottky barrier diode 16 to a level close to that of the −10 V supply 34. The rate at which this process occurs is enhanced by positive feedback arising as follows. As transistor 30 begins to conduct, it draws current via resistor 20 and diode 16 further reducing the voltage at $N_2$. Diode 16 is now strongly forward-biased, and draws current via resistor 20 reducing the voltage at $N_1$. This takes the voltage across APD 12 below breakdown or $V_{BR}$, and quenches the current avalanche. After RC delay at 58 and pulse-shaping at Schmitt trigger 60, the signal at comparator output 54 reaches the base of transistor 42 at $N_4$ switching this transistor on at $t_4$. Current therefore flows from +5 v supply 46 to earth 50 via transistor 42, line 36 and resistor 48. This raises the potential of node $N_2$ well above $V_{REF}$. A short time later at $t_5$, comparator 40 responds by changing both output states. Transistor 30 then switches off immediately, so that diode 16 becomes reverse-biased. Since at $t_5$ both diodes 16 and 18 are non-conducting, the series arrangement of resistor 20 and APD 12 is isolated, and APD 12 recharges its capacitance through resistor 20. Since resistor 20 is 1 kohm, and APD capacitance is in the order of 2 pF, the recharging time constant would be about 2 nanoseconds (ignoring other sources of capacitance), more than an order of magnitude below that of prior art passive quenching and less than 5 nanoseconds. Moreover, APD 12 recharges passively at a rate determined by its own capacitance and series resistor 20. It is therefore allowed to reset itself naturally. This avoids prior art active recharging difficulties where a reset pulse must reset the APD very accurately without giving rise to spurious detection signals.

Figure 2:
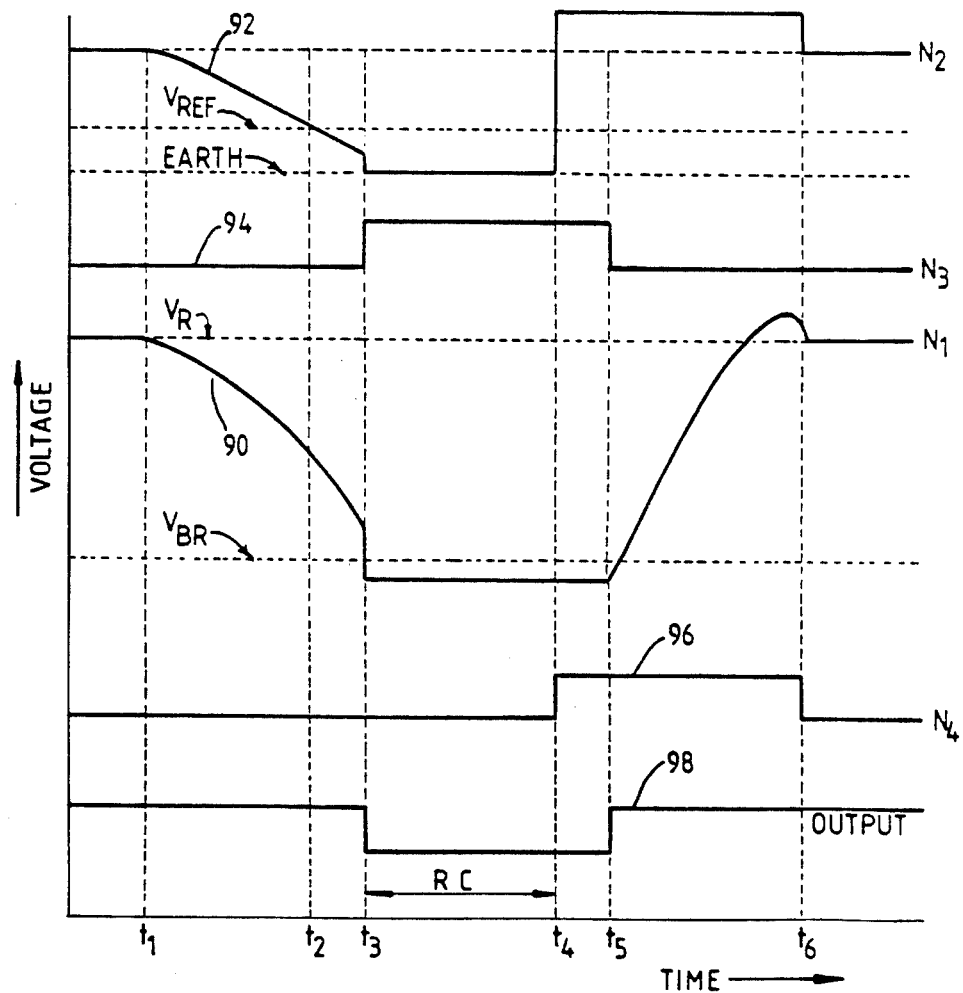

At time $t_6$, the non-inverting output signal from comparator 40 reaches $N_4$ after delay at 58 and transistor 42 is switched off. This re-establishes the current path through resistor 22, diode 18 (now forward-biased) and resistor 48. $N_1$ returns to its quiescent level of +2.0 V, which is overshot a little during APD recharge, and $N_2$ returns to 1.56 V, 30 mV above $V_{REF}$. The approximate time intervals characterising circuit operation are set out in Table I. Comparison of Table I with FIG. 2 shows that the latter has a non-linear time scale for the purposes of illustrational clarity. In particular $t_2$-$t_1$ has been increased in FIG. 2 to show APD avalanche clearly.

TABLE I

| Time Interval | Description | Magnitude (nanoseconds) |
|---|---|---|
| $t_3 - t_1$ | Quenching Delay Time | 8 |
| $t_5 - t_3$ | Quenching Time Output Pulse Width | 22 |
| $t_6 - t_4$ | Reset Time | 22 |
| $t_6 - t_1$ | Total Circuit Dead-Time | 47 |
| $t_3 - t_2 = t_5 - t_4$ | Comparator Response Time | 3 |
| $t_4 - t_3 = t_6 - t_5$ | RC delay = APD Recharge Time | 18 |

The time intervals set out in Table I will vary according to choice of APD, comparator, $V_{REF}$ value, RC delay and also stray circuit capacitance. The values shown are accordingly only typical ones.

The circuit 10 has the following characteristics (ignoring the effects of stray capacitance). The output pulse width is constant, and equal to the sum of the RC delay time and the comparator response time. There is accordingly no difficulty with varying pulse widths for subsequent counting circuits to deal with. The total circuit dead-time is 47 nanoseconds, of which 42 nanoseconds arises from twice the sum of the delay and comparator response times. The dead-time is therefore predominantly due to the comparator and delay, and variation between the quenching delay times of different APDs has only a small effect. Consequently, the minimum interval between pulses is predetermined and substantially constant. This inhibits miscounting in subsequent circuits arising as a result of insufficiently well separated pulses. The RC delay should preferably be equal to at least one quarter of the total circuit dead-time.

In order to minimise the quenching delay time, it is necessary to set $V_{REF}$ as closely as possible to the voltage at $N_2$ when the circuit 10 is quiescent. However, there will always be a certain amount of circuit noise at $N_2$, and such noise should not give rise to spurious comparator output pulses. The difference between $V_{REF}$ and the $N_2$ voltage should be large enough to discriminate against noise. In the foregoind embodiment, a difference of 30 mV has been found to be suitable.

Before the comparator 40 responds, by virtue of the finite comparator response time the avalanche will not be quenched until the APD potential has fallen by more than 30 mV. This fall should correspond to a current of less than $I_{latch}$ (50 microamps in the foregoing example) to avoid an unquenchable avalanche producing heating and comsequent increase in APD dark current. $I_{latch}$ should therefore correspond to a fall greater than that reached at $t_3$. This is satisfied if the resistance of the combination of resistors 20 and 48 is parallel is bout 680 ohms, this being the effective working load for the APD 12. These prameters result in a maximum reduction of about 35 mV in the voltage at $N_2$ between times $t_1$ and $t_3$. For the purpose of maximising APD speed of response, resistor 20 should be as small as possible. However, the foregoing discussion indicates that discrimination against circuit noise dictates a minimum value for resistor 20. Furthermore, reducing the value of resistor 20 reduces the voltage produced by a given photodiode current, and demands increased comparator gain or sensitivity. Since a comparator has a largely constant gain-bandwidth product, operating speed of response will deteriorate as resistor 20 is reduced.

The quenching circuit 10 of FIG. 1 is a satisfactory practical embodiment under conditions of substantially constant ambient temperature. However, under conditions of varying temperature, component parameters such as diode voltages tend to drift. The design of the circuit 10 may be modified to provide for improved temperature insensitivity as set out in FIGS. 3 and 4. In these drawings, parts previously referred to or their equivalents are like-referenced, and change in component type or value is indicated by a prime superscript to the corresponding reference numeral.

Referring to FIG. 3, the transistor 30 is paired with a second like transistor 130 to form a long-tailed pair differential amplifer. They share a 150 ohm variable emitter resistor 32', this being connected to a −15 V supply 34'. The resistor 32' sets the value of the APD 12 quenching voltage at circuit node $N_1$. It sets the current switchable through transistor 30 and flowing in resistor 28 in parallel with resistor 20 and diode 16 in series. The transistor 130 has a collector resistor 132 connected to earth at 134. It receives a base input signal from the non-inverting output 54 of comparator 40 (not shown) via a parallel arrangement of a 7.5 volt zener diode 136 and a 2.7 nF capacitor 138. Similarly, transistor 30 receives a base input signal from inverting comparator output 70 via capacitor 74 in parallel with a 7.5 V zener diode 72'. The transistor 130 is furnished with base bias via a 1.8K resistor 140 connected to a −15 V supply 142.

The operation of the FIG. 3 arrangement is straightforward, and will only be outlined breifly. Operating voltages set by supply 34', resistor 32' and zener diodes 72' and 136 differ somewhat from the equivalent in circuit 10 to permit operation of the long-tailed pair 30/130 at appropriate voltage bias levels. The long-tailed pair responds to the difference between comparator outputs 54 and 70 received via like diode/capacitor elements 136/138 and 72'/74 respectively. Accordingly, switching of transistor 30 for the purposes of reverse-biasing diode 16 and recharging APD 12 (see FIG. 1) now takes place in response to the difference between comparator outputs 54 and 70. Since zener diodes 136 and 72' are of like value, their voltages will have like temperature dependence. Moreover, comparator output voltage drift with temperature will affect both outputs 54 and 70 equally. The long-tailed pair 30/130 is accordingly comparatively insensitive to temperature drift of comparator output and zener diode voltage, since its substracting properties cancel these out to a substantial extent.

Turning now to FIG. 4, there is shown a circuit 150 for the generation of comparison voltage $V_{REF}$ for supply to the inverting input 52 of comparator 40 (not shown). The circuit 150 comprises a series arrangement of a 1K ohm resistor 152, a diode 154, a variable 100 ohm resistor 156 and a 2.2K ohm resistor 158, these being connected between +5 V and −5 V supplies 160 and 162. An output line 164 is connected to a point 166 between resistors 156 and 158, and provides $V_{REF}$ to comparator input 52 (not shown). A 100 nF capacitor 170 is connected betweeen the line 164 and earth. $V_{REF}$ is set to the required value of +1.53 V by adjustment of variable resistor 156. Apart from this resistor, the circuit 150 contains similar components and identical voltage supplies to the elements 22/20/18/48/50 (see FIG. 1) providing APD voltage bias and signals to non-inverting comparator input 38. Changes in supply voltages and component values (apart from resistor 156) due to temperature drift will, therefore, produce substantially equal changes in signals at comparator inputs 38 and 52, which maintains more accurately the difference between these signals. Temperature-induced changes in the value of resistor 156 are negligible, since this resistor contributes only a small part of the voltage drop between supplies 160 and 162. Detection of APD avalanches by the comparator 40 is, therefore, largely unaffected by variation in supply voltages and component values induced by temperature drift.

Referring now to FIG. 5, there is shown a further modification to the circuit 10 designed to provide an output signal into a 50 ohm load. Here again parts previously referred to or their equivalents are like-referenced with a prime superscript where appropriate to indicate change in nature. The Schmitt trigger circuit 60 becomes a like circuit 60' having inverting and non-inverting outputs 60'a and 60'b respectively. Of these, output 60'a is connected to element 62/64 of FIG. 1 as before. The outputs 60'a and 60'b are connected to respective inverting and non-inverting inputs 170 and 172 of a balanced buffer amplifier 174. The amplifier 174 has an output 176 for connection to a fifty ohm load. It will be noted that the Schmitt Trigger 60' receives signals only from comparator output 54, and is in principle sensitive to comparator output voltage drift with ambient temperature change. However, in practice, this drift is normally much smaller than the voltage required to activate the Schmitt Trigger 60'. Compensation in this respect is therefore unnecessary under most circumstances.

What is claimed is:
1. An avalanche photodiode quenching circuit including an avalanche photodiode and a comparator means having an input for detecting avalanche initiation by comparing photodiode potential with a reference potential said circuit comprising:
 (a) a ballast resistor in series with and arranged for recharging the photodiode;
 (b) a quenching circuit connected to the photodiode and arranged to reduce photodiode potential in response to avalanche detection by the comparator and to be deactivated by comparator reset;
 (c) a reset circuit for resetting the comparator input after a preset delay activated in response to avalanche detection by the comparator and deacti- vated after a preset delay in response to comparator reset; and (d) isolating means arranged to isolate the photodiode electrically from the quenching circuit during quiescence and recharge and from the reset circuit and comparator during quench and recharge.

2. A circuit according to claim 1 having a total circuit dead-time wherein the preset delay is at least one quarter of the total circuit dead-time.

3. A circuit according to claim 1 wherein the ballast resistor and photodiode have a recharging time constant of less than 5 nanoseconds.

4. A circuit according to claim 1, wherein the quenching circuit and the reset circuit incorporate fast-switching transistors activated by the comparator and arranged to alter photodiode bias potential and comparator input voltage in response to activation.

5. A circuit according to claim 1 wherein the isolating means comprises fast-switching low capacitance diodes arranged to produce conducting and non-conductging diode states during quiescence and recharge or quench and recharge as appropriate.

6. A circuit according to claim 1 wherein the comparator has inverting and non-inverting outputs and the quenching circuit includes a differential amplifier having two inputs connected to respective comparator outputs, the differential amplifier having input biasing means including matched components.

7. A circuit according to claim 1 wherein said circuit includes an avalanche photodiode biasing circuit comprising electronic components conencted between voltage supply points, and a reference voltage generating circuit including like components connected between like points.

8. An avalanche photodiode quenching circuit including a photodiode, comprising:

(1) a comparator means for detecting avalanche initiation by comparing photodiode potential with a reference potential;

(2) a ballast resistor means, in series with said photodiode, for recharging the photodiode;

(3) a quenching circuit means, connected to the photodiode, for reducing photodiode potential in response to avalance detection by said comparator means and for being deactivated by a comparator reset signal;

(4) a reset circuit means, in response to avalanche detection by the comparator means, for resetting the comparator input after a preset delay and, in response to comparator reset, for being deactivated after the preset delay; and (5) isolating means for isolating the photodiode electrically from the quenching circuit means during quiescence and recharge, and from the reset circuit means and comparator means during quench and recharge.

9. A circuit according to claim 8 having a total circuit dead-time and wherein the preset delay is at least one quarter of this dead-time.

10. A circuit according to claim 8 whrein the ballast resistor means and photodiode have a recharging time constant of less than 5 nanoseconds.

11. A circuit according to claim 8 wherein the quenching current means and reset circuit means incorporate fast-switching transistors activated by the comparator means and arranged to alter potential of said photodiode and comparator means input voltage in response to activation.

12. A circuit according to claim 8 wherein the isolating means comprises fast-switching low capacitance diodes including biasing means for producing conducting and non-conducting diode states during quiescence and recharge or quench and recharge, respectively.

13. A circuit according to claim 8 wherein said comparator means has inverting and non-inverting outputs and said quenching circuit means includes a differential amplifier having two inputs connected to respective comparator outputs, said differential amplifier including input biasing means including matched components.

14. A circuit according to claim 8 including an avalanche photodiode biasing circuit connected between voltage supply points, and a reference voltage generating circuit including similar components connected between like voltage supply points.

* * * * *